United States Patent [19]

Propst et al.

[11] 4,277,079
[45] Jul. 7, 1981

[54] MATERIAL HANDLING SYSTEM

[75] Inventors: Robert L. Propst, Bellvue, Wash.; Paul L. Propst, Ann Arbor, Mich.

[73] Assignee: Herman Miller, Inc., Zeeland, Mich.

[21] Appl. No.: 81,687

[22] Filed: Oct. 4, 1979

[51] Int. Cl.³ .......................... B60D 1/16; B62D 53/00
[52] U.S. Cl. ............................... 280/411 R; 180/14 R; 180/19 R; 280/408; 280/415 R; 280/477
[58] Field of Search .................. 213/75 TC; 108/52.1, 108/55.1; 296/158, 170, 164, 166; 104/172; 105/26 R, 26.1, 90 A; 180/11, 19 R, 12, 14 R, 19 S, 15, 19 H; 280/33.99 R, 408, 410, 411 R, 411 C, 415 R, 415 A, 417, 423 R, 425 R, 438 R, 444, 456 R, 460 R, 477, 478 R, 495, 500, 504, 505, 508, 509, 510, 511, 515

[56] References Cited

U.S. PATENT DOCUMENTS

| | | | |
|---|---|---|---|
| 1,424,788 | 8/1922 | Westlake et al. | 280/477 |
| 1,522,707 | 1/1925 | Andrew et al. | 108/55.1 X |
| 1,535,203 | 4/1925 | Cook | 280/408 X |
| 1,677,618 | 7/1928 | Clement | 280/408 |
| 1,848,956 | 3/1932 | Koehler | 280/500 X |
| 2,827,307 | 3/1958 | Osborn | 280/417 |
| 3,037,792 | 6/1962 | Colpo | 280/438 A X |
| 3,464,719 | 9/1969 | Tantlinger | 280/438 A |
| 4,052,084 | 10/1977 | Propst | 280/408 |

Primary Examiner—Joseph F. Peters, Jr.
Assistant Examiner—Randall A. Schrecengost
Attorney, Agent, or Firm—Olsen and Stephenson

[57] ABSTRACT

A material handling system comprising a plurality of material-transporting lorries adapted to be pivotally connected end-to-end and a towing vehicle adapted to pull a train of connected lorries. Each of the lorries has a load-carrying body portion, end portions extending transversely of the body, and ground-engaging wheels arranged in substantially spaced pairs supported on the end portions. The towing vehicle has a low-profile rear section which can be moved under one of the end portions of the lorries between the wheels to releasably connect the towing vehicle and the first lorry. A projection extends upwardly from the rear section of the towing vehicle, into a recess formed in the front side of the lorry end portion and is maintained therein by a spring actuated abutment member which engages the back side of the lorry end portion. The projection and the abutment member thus cooperate to restrict relative horizontal movement of the towing vehicle and the lorry.

9 Claims, 7 Drawing Figures

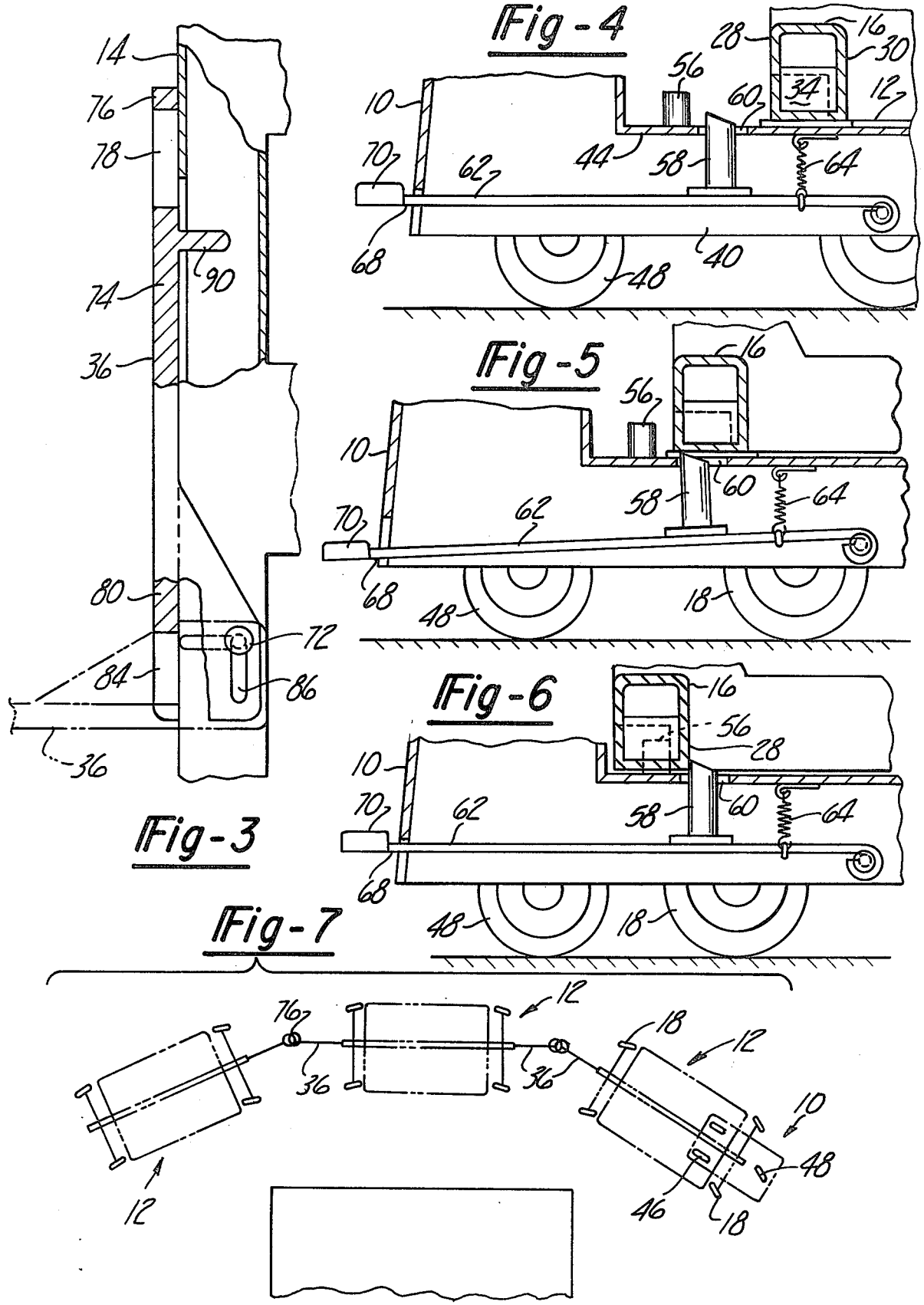

MATERIAL HANDLING SYSTEM

BACKGROUND OF THE INVENTION

This invention relates generally to material handling systems and specifically to systems in which a towing vehicle is used to transport a plurality of material-supporting units in a train. Such a system is disclosed in U.S. Pat. No. 4,052,084 assigned to the assignee of this application. The present invention constitutes an improvement over the apparatus shown in the aforementioned patent.

Material handling systems of the type shown in U.S. Pat. No. 4,052,084 have been used satisfactorily in the past. However, conventional towing vehicles have not been ideally adaptable to hook-up and transport of material-supporting lorries of the type here disclosed. As a result, hook-up of the vehicle and units often requires manual maneuvering of the units which, when the units are fully loaded, can be both difficult and time consuming. Furthermore, conventional towing vehicles have exhibited less than optimal control over the train due to the nature of conventional connection means on the vehicle and the first unit in the train, thus making movement in confined spaces either dangerous to surrounding furnishings or altogether impossible. Additionally, the cooperating configuration which allows the towing vehicle to locate almost entirely under a load-bearing lorry makes it possible to load both lorry and towing vehicle onto relatively small elevators.

It is an object of the present invention, therefore, to provide an improved material handling system utilizing customized towing vehicles and material-supporting units specifically adapted to circumvent problems associated with manual manipulation of loaded units. It is a further object to provide an improved means of joining the vehicle to the material-supporting units to increase maneuverability of a train of units.

SUMMARY OF THE INVENTION

The improved material handling system of this invention utilizes a material-supporting lorry having a load-carrying body, end portions extending transversely of the body and ground wheels secured in substantially spaced pairs on the end portions. At least one of the end portions has a front side and a back side and structure forming a recess of predetermined width and depth in the front side wherein the depth of the recess is substantially less than the distance between the front and back sides of the end portion. Interlocking tongue members are provided on the end portions of the lorry to pivotally connect the lorry to a similar adjacent lorry.

The improved towing vehicle of this invention has a front section and a back section which has a sufficiently low profile that allows it to be moved under the aforementioned one end of a material-supporting lorry between the wheels of the lorry. An upwardly extending projection is provided on the vehicle back section that is dimensioned to fit into the recess located on the end portion of the lorry. The towing vehicle is also provided with a spring-actuated abutment member which is movable between raised and lowered positions through an opening provided on the vehicle back section substantially rearward of the projection. The abutment member is secured to a lever pivotally mounted on the vehicle and spring means is provided on the lever to urge the abutment member toward its raised position. The top portion of the abutment member is inclined upwardly and forwardly so that when the vehicle moves toward the lorry for connection thereto, the lorry end portion first engages the abutment member top portion and forces the member against the spring pressure toward its lowered position. When the lorry end portion has passed over the abutment member top portion, the abutment member springs up to its raised position and abuts against the back side of the lorry end portion. The lorry is therefore restricted against horizontal forward and backward movement relative to the vehicle by the nature of its engagement with the projection and the abutment member. Transverse horizontal movement relative to the vehicle is prevented by engagement of the projection with the sides of the structure forming the recess in the lorry end portion. The lever on which the abutment member is mounted has a portion which extends outwardly from the vehicle, allowing manual release of the abutment member from the lorry.

The improved connecting mechanism for the lorry and towing vehicle of this invention provides a positive location to which the operator of the system can easily guide the vehicle for hook-up with the lorry. The vehicle is simply backed up toward the lorry until the abutment member snaps into place behind the lorry end portion. This arrangement precludes the necessity of manually moving the lorry itself. The connection thus made, furthermore, provides for secure and well-controlled tracking of the lorry behind the vehicle which, combined with the end-to-end interlocking connection of similar material-supporting lorries, produces the advantage of increased maneuverability of a train of lorries in a confined space.

Further objects, features, and advantages of this invention will become apparent from a consideration of the following description, the appended claims, and the accompanying drawing in which:

FIG. 3 is an enlarged transverse sectional view of an end portion of the material supporting lorry of this invention with some parts shown in section and other parts broken away and showing the stored position of a tongue in solid lines and the attaching position of the tongue in broken lines;

FIGS. 4 through 6 are fragmentary sectional views of the towing vehicle and lorry end portion in the system of this invention showing progressive movement of the vehicle toward the lorry to a connecting relation; and FIG. 7 is a schematic view of the material handling system of this invention.

Figure 1:
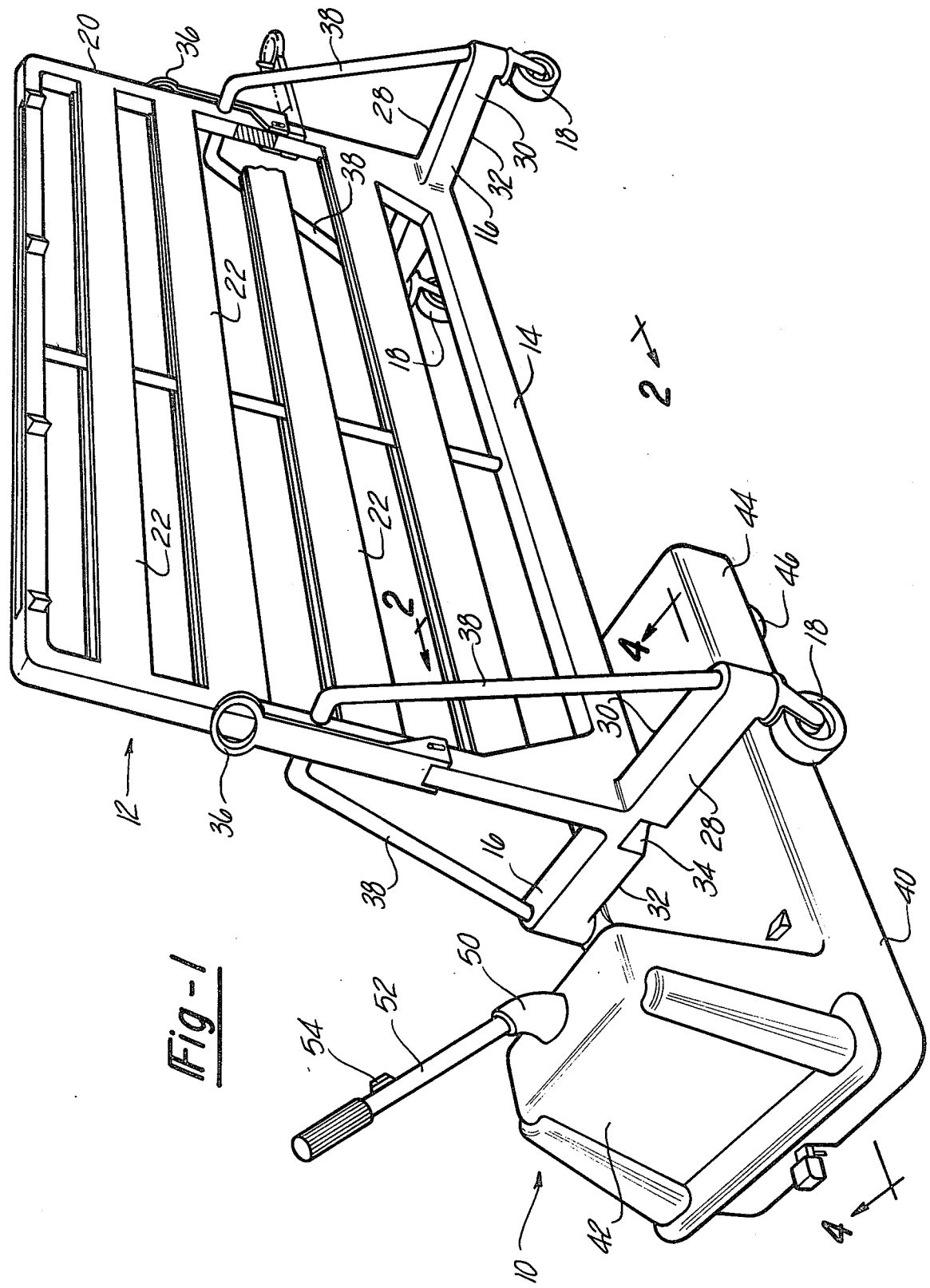
FIG. 1 is a perspective view of the material-supporting lorry and towing vehicle of the material handling system of this invention.
Figure 2:
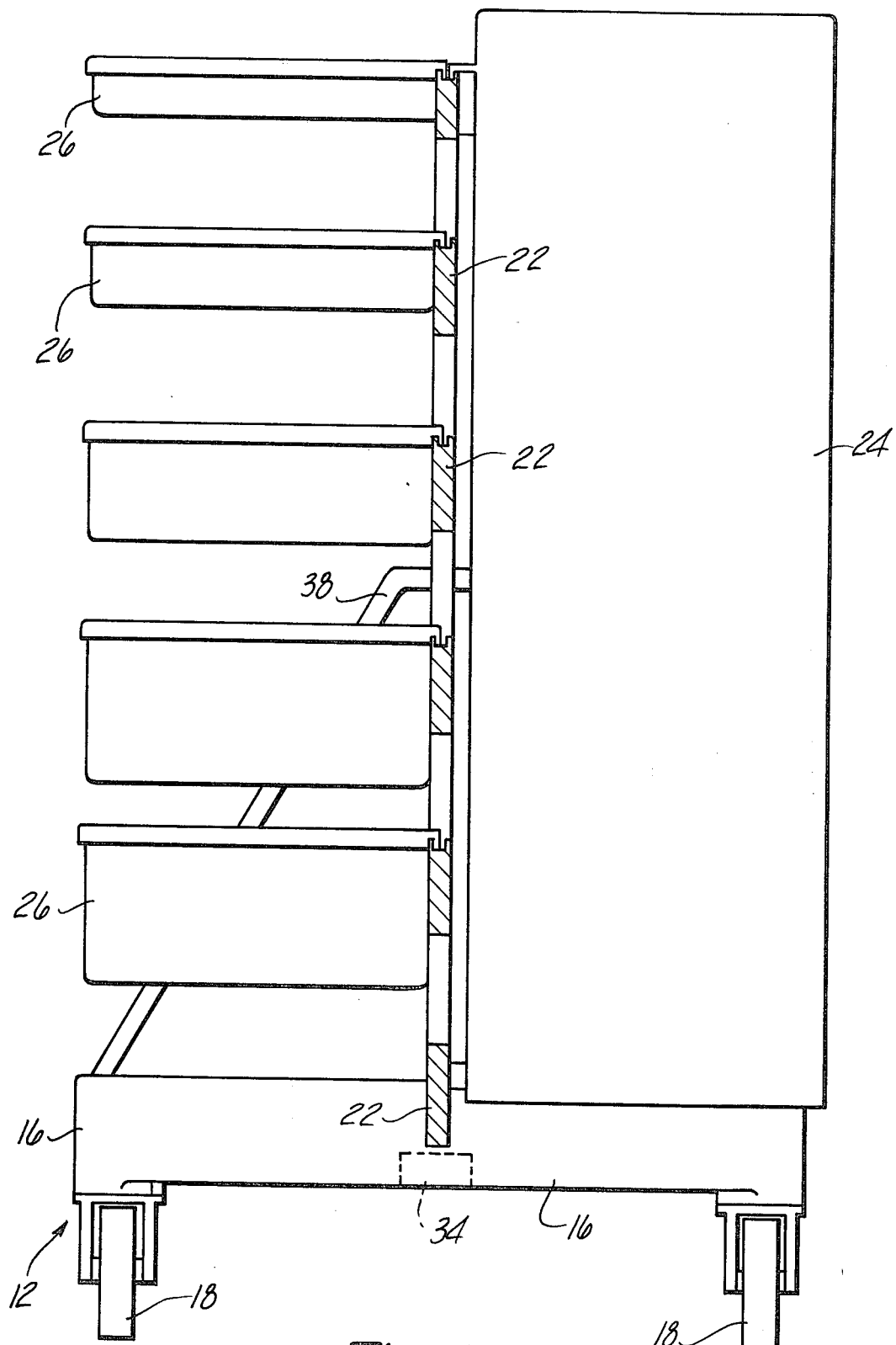
FIG. 2 is a longitudinal sectional view of the material-supporting lorry of this invention showing various material containers supported thereon, as seen from substantially the line 2—2 in FIG. 1.

With reference to the drawing, the towing vehicle and the material-supporting lorry of this invention, indicated generally at 10 and 12, respectively, are shown in FIG. 1 in a connected relation. The vehicle 10 is sometimes referred to as a "tug" because its principal function is to move and manipulate lorries 12. The lorry 12 comprises a load-carrying body 14 having a pair of end portions 16 which extend transversely of the body 14, and pairs of ground-engaging casters 18 secured to the end portions 16 at substantially the outer edges thereof. In a preferred embodiment, the body 14 includes an upright portion 20 in which a plurality of storage racks 22 are formed. Illustrated in FIG. 2 as representative of the various sizes and shapes of material containers which can be supported on the racks 12 are a locker 24 adapted to receive large materials and a plurality of trays 26 adapted to receive smaller objects. Each of the end portions 16 has a front side 28, a back side 30, and a bottom side 32 which is maintained in a spaced relation with the ground by the casters 18.

At least one of the end portions 16 is provided with a recess 34 formed in the front side 28 thereof to a predetermined width and depth. The end portion 16 with the recess 34 is hereinafter referred to as the front end portion, it being understood that similar recesses 34 may be formed in either or both of the end portions 16. The width of the recess 34 is substantially less than the distance between the front side 28 and the back side 30 of the front end portion 16. The lorry 12 also includes a pair of tongue members 36 secured to the ends of the body upright portion 20 for a purpose to be explained presently. Reinforcing struts 38 extending between the upright portion 20 and the end portions 16 are provided on the lorry 12 to increase the load supporting capability thereof and to facilitate manual handling of the lorry 12.

The towing vehicle or tug 10 of this invention comprises a frame 40 which has a front section 42 and a low profile back section 44 adapted to be moved under the front end portion 16 of the lorry 12. A pair of drive wheels 46 and a steering wheel 48 are secured to the under side of the frame 40 (FIG. 7). The vehicle 10 also includes a steering mechanism 50 provided with an operating shaft 52. A switch 54 located on the shaft 52 is operable to start and stop a conventional drive motor (not shown) which will move the vehicle 10 in forward or backward directions.

With reference now to FIG. 4, the tug 10 has an upwardly extending projection 56 on the frame portion 44 which is received by the recess 34 on the lorry front end portion 16 upon backward movement of the vehicle 10 relative to the lorry 12 to connect the lorry 12 to the vehicle 10. The projection 56 is engageable with the sides of the recess 34 to thereby prevent relative horizontal movement of the vehicle 10 and the lorry 12 in three directions.

At least one abutment member 58 is movably mounted on the vehicle frame portion 44 for movement through an opening 60 in the frame 40 between a lowered position (FIG. 5) and a raised position (FIG. 6) in which it abuts against the back side 30 of the lorry front end portion 16 to thereby limit relative horizontal movement of tug and lorry in a fourth direction (FIG. 6). The abutment member 58 is mounted on a lever 62 which is pivotally secured to the frame 40. A tension spring member 64 is attached to the lever 62 and to the frame 40 and is maintained in a tensioned state to continually urge the abutment member 58 toward its raised position. The abutment member 58 has a top cam surface 66 which is inclined upwardly and forwardly so that a forwardly directed horizontal force applied to the top portion 66 is operable to move the member 58 toward its lowered position.

Manipulation of the vehicle 10 and the lorry 12 to accomplish connection thereof is illustrated in FIGS. 4 through 6 and consists of the following. The switch 54 is operated to move the tug 10 backwardly toward the lorry 12, which usually remains stationary under the inertia of a full load. The low profile back section 44 is guided by means of the steering mechanism 50 under the lorry front end 16 between the casters 18. The front side 28 of the end portion 16 eventually engages the abutment member top portion 66 to thereby move the abutment member 58 to the lowered position shown in FIG. 5. When the top portion 66 has passed under the end portion 16, the abutment member 58 moves up to its raised position abutting against the back side 30 of the end portion 16. Further forward, backward, or side-to-side movement of the lorry 12 relative to the vehicle 10 is prevented by engagement of the projection 56 and the abutment member 58 with the end portion 16. The lever 62 has a forward portion 68 which extends outwardly from the frame 40 and has a pedal 70 secured thereto. The pedal can be operated to move the abutment member 58 to its lowered position to release the lorry 12 from connection with the tug 10, when desired.

With reference now to FIG. 3, the tongue member 36 is pivotally mounted on the body 14 for rotation about a horizontal pin 72 on the body 14 between a substantially vertical stored position, shown in solid lines, and a substantially horizontal towing position shown in broken lines. The tongue member 36 is constructed so that it has a straight body portion 74 having an outer end portion 76 in which an opening 78 is formed, and an inner end portion 80 which includes a pair of flanges 84. The flanges 84 are disposed on opposite sides of the upright lorry portion 20. The pin 72 extends through a pair of slots 86 formed in the flanges 84.

The tongue 36 is translatable vertically relative to the pin 72 between positions in which the pin 72 is located at top and bottom ends of the slots 86. When the pin 72 is located at the top ends of the slots 86, the tongue end portion 80 contacts the lorry body 14 and prevents rotation of the tongue 36, thereby retaining the tongue 36 in its stored upright position. When the tongue 36 is raised so that the pin 72 is located at the bottom ends of the slots 86, the tongue is capable of rotation through an arc of approximately ninety degrees to a substantially horizontal position shown in broken lines in FIG. 3 in which the end portion 80 again contacts the lorry body 14 and prevents further rotation. The tongue 36 further includes a projection 90 which extends upwardly from the end portion 74 in the horizontal position of the tongue. The opening 78 in one tongue will receive the projection 90 on the tongue 36 for an adjacent similar lorry 12 to thereby provide pivotal end-to-end connection of lorries 12. The pivotal connection thus provided, combined with the aforementioned means of connecting lorries 12 to the tug 10 of this invention, facilitates maneuvering of a train of lorries 12 in a confined space, as seen in FIG. 7.

This invention thus provides an improved material-supporting unit 12 and towing vehicle 10 which make efficient use of time and space in material handling. Coacting projection and recess means 56 and 34 and abutment means 58 are provided to securely connect the unit 12 to the vehicle 10 without manual manipulation of the unit 12. Once connected, the mobility of the tug 10 with the single steer wheel 48 facilitates movement of the train, regardless of the number of lorries 12 therein. When there are several lorries in the train (FIG. 7), the pivotally connected tongues 36 facilitate the tracking of each lorry behind the towing lorry 12.

What is claimed:
1. In a material handling system,
a transport unit having a load-carrying body portion,
end portions extending transversely of said body portion and ground wheels secured to said end portions and arranged in substantially spaced pairs thereon, a transport vehicle having a frame and ground-engaging drive wheels, coacting means on said vehicle frame and one of said transport unit end portions at a position between the pair of wheels thereon operable to releasably connect said frame and said end portion for controlled movement of said transport unit in response to movement of said vehicle, said vehicle frame comprising a front section and a back section, said back section being located so that said vehicle can be moved toward said transport unit to a position in which said back section underlies said end portion, coacting abutment means on said back section and said end portion releasably connecting said frame to said end portion, said coacting abutment means comprising projection means on said vehicle frame extending upwardly therefrom, means forming a recess in said transport unit end portion operable to receive said projection means upon horizontal movement of said vehicle frame to thereby limit relative movement of said transport unit and said vehicle, and means on said end portion and said frame operable to retain said projection means in said recess in the connected positions of said vehicle and frame and said transport unit and to restrict articulation of said transport unit and said vehicle.

2. The structure according to claim 1, wherein said means retaining said projection means in said recess comprises abutment means movably mounted on said frame for movement between a raised position extending substantially upwardly from said frame and a lowered position, said abutment means being operable in said raised position to abut against said end portion.

3. The structure according to claim 2, wherein said one of said transport unit end portions has front and rear sides and said recess is formed in the front side of said end portion and said abutment means engages the back side of said end portion.

4. The structure according to claim 3, further including spring means operable to urge said abutment means toward said raised position and wherein said abutment means has a top portion inclined upwardly and forwardly toward said vehicle frame front section so that movement of said end portion over said top portion depresses said abutment means to said lowered position and subsequent removal of said end portion from engagement with said top portion causes said abutment means to move to said raised position.

5. The structure according to claim 3, wherein said coacting means further includes a lever rotatably mounted on said vehicle frame, said abutment means being mounted on said lever and movable in response to rotation of said lever between said raised and lowered positions, said lever having a portion extending outwardly from said frame to allow manual operation of said abutment means between said raised and lowered position.

6. The system according to claim 5, wherein said ground wheels are casters so that transport units are pivotal in a horizontal plane relative each other, thereby enabling tracking of said units.

7. In a material handling system, a transport unit having a load-carrying body portion, end portions extending transversely of said body portion and ground wheels secured to said end portions and arranged in substantially spaced pairs thereon, a transport vehicle having a frame and ground-engaging drive wheels, coacting means on said vehicle frame and one of said transport unit end portions at a position between the pair of wheels thereon operable to releasably connect said frame and said end portion for controlled movement of said transport unit in response to movement of said vehicle.

connecting means on said transport unit enabling end-to-end connection of said unit and a similar transport unit, said connecting means comprising a tongue having a straight portion, a first end portion having an opening therein, a second end portion rotatably mounted on said transport unit body portion and movable between a position in which said straight portion extends substantially horizontally and a stored position in which said straight portion extends substantially vertically, and an attaching flange secured to said straight portion and extending outwardly therefrom, said opening on one transport unit tongue being operable to receive said flange on an adjacent unit to thereby connect said units, means rotatably securing said second end portion to said transport unit body portion comprising a pair of spaced attaching portions secured to said second end portion, means forming a slot in each of said attaching portions, and a pin mounted on said transport unit body portion, said pin being positioned in said slots, said tongue being translatable relative said pin between a position in which said pin is located at one end of said slots and coacts with the abutting of said body portion by said second end portion to retain said tongue in said vertical position and a position wherein said pin is located at the opposite end of said slots and coacts with the abutting of said body portion by said second end portion to restrict rotation of said tongue about said pin between said vertical position and said horizontal position.

8. A transport unit having a load-carrying longitudinal body portion, end portions of predetermined width extending transversely of said body portion, caster wheels secured to said end portions and arranged in substantially spaced pairs thereon, at least one of said end portions having a front side and a back side, and means forming a recess of predetermined width and depth in said front side of said one of said end portions and extending backwardly toward said back side to a position spaced therefrom, connecting means on said transport unit operable to connect said unit to a similar unit comprising a tongue pivotally secured to each end of said body portion and movable between a stored position in which each said tongue is adjacent said transport unit and a connecting position in which each said tongue extends longitudinally outwardly from said transport unit, each said tongue including a straight portion having an opening therein and an attaching pin extending outwardly therefrom adjacent said opening, said opening on one of said transport unit tongues being operable to receive the pin on the tongue on an adjacent transport unit to thereby pivotally connect said units about a point substantially midway between said units.

9. The apparatus according to claim 8, further including means pivotally securing said tongue to said ends of said body portion comprising a pair of spaced attaching flanges secured to said tongue, means forming slots in each of said flanges and a pin mounted on said transport unit end portion, said pin extending between said attaching portions and being positioned in said slots so that said tongue is translatable relative said pin between a position in which said pin is located at one end of said slots and coacts with the abutting of said body portion by said second end portion to retain said tongue in said stored position and a position wherein said pin is located at the opposite end of said slots and coacts with the abutting of said body portion by said second end portion to restrict rotation of said tongue about said pin between said stored position and said connecting position.

* * * * *